(12) United States Patent
Tang et al.

(10) Patent No.: US 8,193,796 B2
(45) Date of Patent: Jun. 5, 2012

(54) MULTIPHASE POWER REGULATOR WITH LOAD ADAPTIVE PHASE CONTROL

(75) Inventors: Benjamim Tang, Rancho Palos Verdes, CA (US); Robert T. Carroll, Andover, MA (US); Nicholas R. Steffen, Redondo Beach, CA (US); Richard C. Pierson, Newport Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 21 days.

(21) Appl. No.: 12/371,835

(22) Filed: Feb. 16, 2009

(65) Prior Publication Data
US 2009/0224731 A1 Sep. 10, 2009

Related U.S. Application Data

(63) Continuation of application No. 11/480,715, filed on Jul. 3, 2006, now Pat. No. 7,492,134.

(51) Int. Cl.
*G05F 1/00* (2006.01)
(52) U.S. Cl. ......................... 323/283; 323/272
(58) Field of Classification Search .......... 323/271, 323/272, 283, 284, 285; 307/80, 81, 85, 307/86, 87
See application file for complete search history.

(56) References Cited

U.S. PATENT DOCUMENTS

| | | | |
|---|---|---|---|
| 6,366,069 B1 | 4/2002 | Nguyen et al. | |
| 6,670,794 B1 | 12/2003 | Wang et al. | |
| 6,683,441 B2 | 1/2004 | Schiff et al. | |
| 6,803,752 B1 * | 10/2004 | Chen | 323/282 |
| 6,943,535 B1 | 9/2005 | Schiff | |
| 7,262,628 B2 * | 8/2007 | Southwell et al. | 324/769 |
| 2004/0041543 A1 * | 3/2004 | Brooks et al. | 323/212 |
| 2004/0052098 A1 * | 3/2004 | Burstein et al. | 363/72 |
| 2004/0196019 A1 * | 10/2004 | Schneider | 323/285 |
| 2007/0291520 A1 * | 12/2007 | Schuellein | 363/65 |

* cited by examiner

*Primary Examiner* — Adolf Berhane
*Assistant Examiner* — Emily Pham
(74) *Attorney, Agent, or Firm* — Murphy, Bilak & Homiller, PLLC (57) ABSTRACT

Disclosed is a power regulator for providing precisely regulated power to a microelectronic device such as a microprocessor. Improved power regulation is accomplished by optimizing the power efficiency of the power regulator. In particular, in a multiphase system, the number of active phases is increased or decreased to achieve optimum power efficiency. The multiphase voltage regulator adapts the operating mode to maximize efficiency as the load current demand of the load device changes by adjusting the number of active phases to maximize efficiency. The total value of current provided by the regulator and the total number of active phases is determined, the total number of active phases is compared with the number of active phases required to provide the total value of current at maximum efficiency; and the number of active phases is adjusted to provide the total value of current at maximum efficiency.

A current sense circuit senses the current at each phase, a summing circuit coupled to the output of the current sense circuit provides the total current value of all the measured phases, a circuit coupled to the output of the summing circuit provides the time averaged total current value to a threshold detecting circuit that determines the number of phases at which the voltage regulator should be operating for maximum efficiency, and a circuit for comparing the number of phases that are operating to the number of phases at which the voltage regulator should be operating adjusts the number of active phases to the number of phases at which the voltage regulator should be operating for maximum efficiency.

24 Claims, 9 Drawing Sheets

MULTIPHASE POWER REGULATOR WITH LOAD ADAPTIVE PHASE CONTROL

CROSS REFERENCES TO RELATED APPLICATIONS

This application claims priority to Provisional Patent Application 60/698,882, filed on Jul. 13, 2005, entitled MULTIPHASE POWER REGULATOR WITH LOAD ADAPTIVE PHASE CONTROL, by the same inventors as this application.

This application includes subject matter that is related to the following patent applications, commonly assigned to the assignee of the present application, that are hereby incorporated herein by reference:

1. SYSTEM AND METHOD FOR HIGHLY PHASED POWER REGULATION, Ser. No. 10/112,738 filed Apr. 1, 2002, inventors: Duffy, et al., now U.S. Pat. No. 6,563,294.
2. SYSTEM, DEVICE AND METHOD FOR PROVIDING VOLTAGE REGULATION TO A MICROELECTRONIC DEVICE, Ser. No. 10/103,980, filed Mar. 22, 2002, inventors: Duffy et al., now U.S. Pat. No. 6,965,502.
3. SYSTEM AND METHOD FOR CURRENT HANDLING IN A DIGITALLY CONTROLLED POWER CONVERTER, Ser. No. 10/237,903, filed Sep. 9, 2002, inventors: Duffy et al., now U.S. Pat. No. 6,795,009.
4. SYSTEM AND METHOD FOR HIGHLY PHASED POWER REGULATION, Ser. No. 09/975,195, filed Oct. 10, 2001, inventors: Duffy et al., now abandoned.
5. SYSTEM AND METHOD FOR HIGHLY PHASED POWER REGULATION USING ADAPTIVE COMPENSATION CONTROL, Ser. No. 09/978,294, filed Oct. 15, 2001, inventors: Goodfellow et al., now abandoned.
6. SYSTEM AND METHOD FOR HIGHLY PHASED POWER REGULATION USING ADAPTIVE COMPENSATION CONTROL, Ser. No. 10/109,801, filed Oct. 15, 2001, inventors: Goodfellow et al., now U.S. Pat. No. 7,007,176.
7. DIGITAL CALIBRATION WITH LOSSLESS SENSING IN A MULTIPHASE SWITCHED POWER CONVERTER, Ser. No. 10/884,840, filed Jul. 2, 2004, inventors: Southwell et al.
8. MULTI-THRESHOLD MULTI-GAIN ACTIVE TRANSIENT RESPONSE CIRCUIT AND METHOD FOR DIGITAL MULTIPHASE PULSE WIDTH MODULATED REGULATORS, Ser. No. 10/938,031 filed Sep. 10, 2004, inventors Tang et al.

BACKGROUND OF THE INVENTION

1. Technical Field of Invention

The present invention relates to a power regulator for providing precisely regulated power to a microelectronic device such as a microprocessor. Improved power regulation is accomplished by optimizing the power efficiency of the power regulator. In particular, in a multiphase system, the number of active phases is increased or decreased to achieve optimum power efficiency.

2. Background of the Invention

Regulated power supplies or voltage regulators are typically required to provide the voltage and current supply to microelectronic devices. The regulator is designed to deliver power from a primary source to an electrical load at the specified current, voltage, and power efficiency. Switching power converters (SPC) also referred to as Buck regulators are commonly used voltage regulators due to their high efficiency, high current capability, and topology flexibility. In addition, they can be designed to provide very precise voltage and current characteristics required by devices such as microprocessors, microcontrollers, memory devices, and the like.

Power requirements for emerging leading edge technology microprocessors have become very difficult to satisfy. As the speed and integration of microprocessors increases, the demands on the power regulation system increase. In particular, as gate counts increase, the power regulation current demand increases, the operating voltage decreases and transient events (e.g. relatively large voltage spikes or droops at the load) typically increase in both magnitude and frequency. Some emerging microprocessors are expected to run on less than 1.3 volts and more than 100 amperes.

SPC's utilizing step-down multiphase Buck converters have been the preferred topology to meet the low voltage and high current requirements of microprocessors. With the advent of increasingly complex power regulation topologies, digital techniques for power converter control, specifically in multiphase designs, can improve precision and reduce the system's total parts count while also supporting multiple applications in the same power system through digitally programmable feedback control.

Power consumption and thermal management are a major problem in today's computer systems. In systems with many processors, many of the processors are often in idle or less than full power states. When one or more of the processors are in this low power state, it is desirable to reduce the power consumption of the power supply so that the total system power consumption and dissipation is minimized.

One drawback to multiphase buck DC-DC converters is that considerable power is used during light load conditions to switch the multiple buck conversion phases (channels). As a result, the efficiency of multiphase converters can be poor at light loads. In addition, as more phases are added to improve full load efficiency, the light load efficiency becomes worse. The most efficiency sensitive applications such as blade servers often use more phases to improve the full load efficiency but sacrifice medium load and light load efficiency. In many applications, processors spend a majority of the time operating in the medium load range and only use peak load current for short durations. The result is that systems are over designed resulting in higher costs for cooling, AC-DC power supplies, and AC power used.

At medium and lighter loads, fewer phases (channels) of buck conversion can be used to provide the load current. This will make the DC-DC converter more efficient at the typical processor load currents. One problem however is that modern processors can change the load demand very quickly (within microseconds) so that the DC-DC converter must be able to respond to this change in current without an overload (too much current) condition in any of the phases (channels).

In analog multiphase controllers, phase dropping (aka phase shedding) has been implemented to extend battery life. In these applications, a signal is typically used to tell the controller when to enter and exit this more efficient state. There is typically one high efficiency state (1 phase) so the efficiency is not optimized over the entire range. In these controllers the phases cannot be added back fast enough to respond to the current slew rates seen in desktop or server microprocessor chips (1000 Amps/microsecond). Known analog controllers do not have the ability to implement autonomous phase drop/add with adaptive non-overlap control to optimize efficiency over a wide range of load currents and meet the transient requirements of modern microprocessors.

SUMMARY OF THE INVENTION

Accordingly, the present invention provides a multiphase voltage regulator that automatically (autonomously) adapts the operating mode to maximize efficiency as the load current of the processor changes.

In particular, a controller in accordance with the invention implements adaptive phase drop/add with adaptive non-overlap timing and thereby provides optimum efficiency over the entire range of load current in microprocessor power delivery applications. This reduction in power consumption provides lower cost of operation and better energy efficiency since less average AC current is needed to run the system.

A still further feature of the disclosed controller is the ability to vary the non-overlap delay between the turn-off of the synchronous FET and the turn-on of the control FET for each phase setting to further optimize efficiency.

Another feature of the invention is the incorporation of Active Transient Response (ATR) with a multi level sensing technique that detects not only the fact that the voltage excursion requires an active transient response but also detects the amplitude of the excursion. As the transient amplitude passes multiple thresholds, for example in the negative direction, all the previously disabled phases can be activated at once.

These and other features of the invention will become more apparent in the following more detailed description when considered in connection with the drawings where like reference numerals refer to similar elements throughout the Figures.

DETAILED DESCRIPTION

The present invention may be described herein in terms of various functional components and various processing steps. It should be appreciated that such functional components may be realized by any number of hardware or structural components configured to perform the specified functions. For example, the present invention may employ various integrated components comprised of various electrical devices, e.g. resistors, transistors, capacitors, inductors and the like, whose values may be suitably configured for various intended purposes. Any actual values provided for such components as well as applied voltage levels and currents are intended by way of example and not limitation.

In addition, the present invention may be practiced in any integrated circuit application. Such general applications and other details that will be apparent to those skilled in the art in light of the present disclosure are not described in detail herein. Further, it should be noted that while various components may be suitably coupled or connected to other components within exemplary circuits, such connections and couplings can be realized by direct connection between components, or by connection through other components and devices located therebetween.

Figure 1:
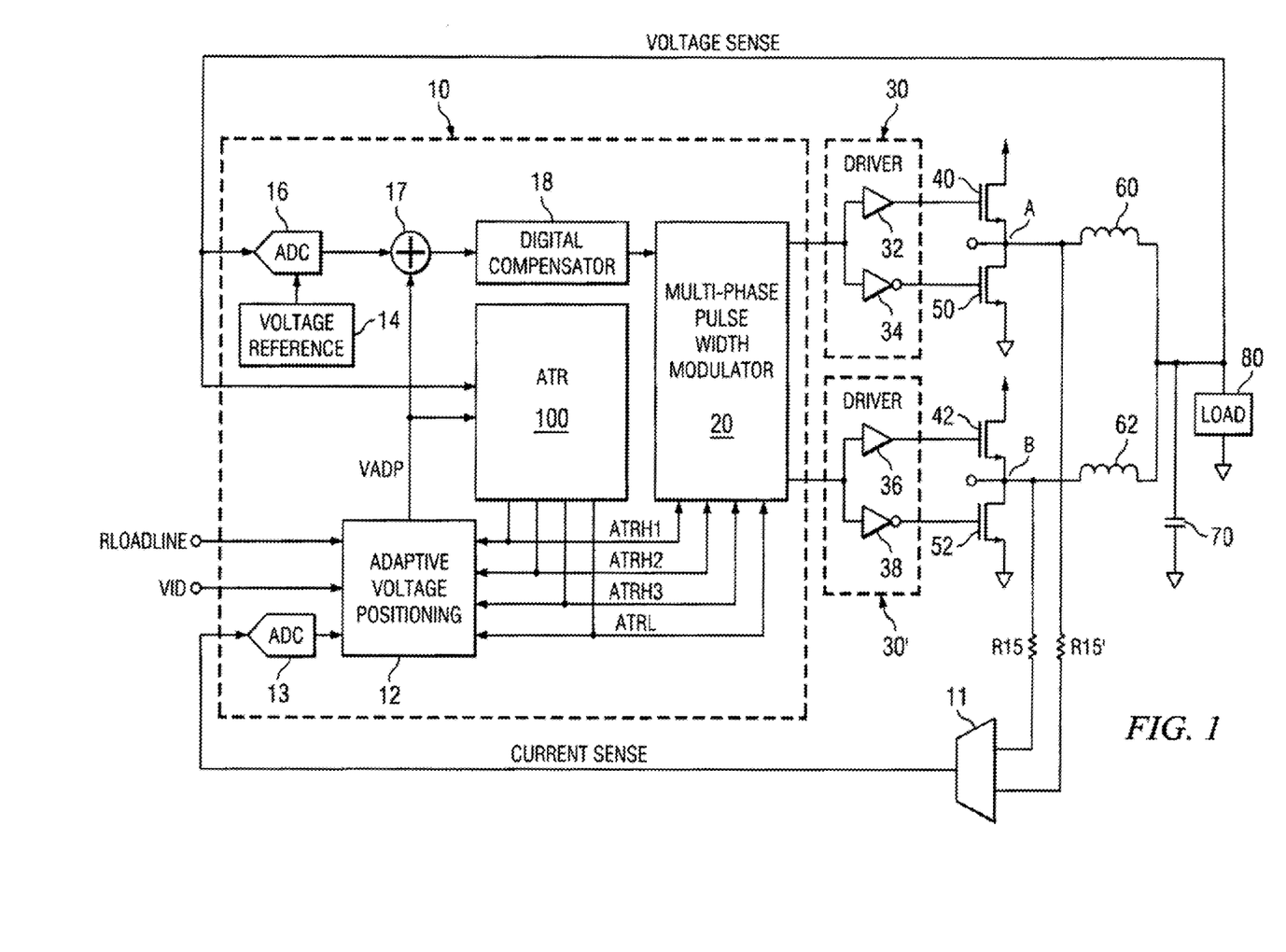
FIG. 1 is a schematic diagram of a digital multiphase buck regulator that was disclosed in some of the related patent applications cross-referenced herein.

Refer now to FIG. 1, which is a schematic diagram of a Digital Multiphase Buck Regulator that has previously been described in detail, for example, in the cross-referenced patent applications that have been incorporated herein by reference, in particular MULTI-THRESHOLD MULTI-GAIN ACTIVE TRANSIENT RESPONSE CIRCUIT AND METHOD FOR DIGITAL MULTIPHASE PULSE WIDTH MODULATED REGULATORS, Ser. No. 10/938,031 filed Sep. 10, 2004, inventors Tang et al.

It is also known as a Digital Multiphase Buck Converter because it converts a relatively high supply potential (+V) at e.g. 12 volts to a low voltage, e.g. 1 to 3 volts provided to a load at very high current levels. Digital controller 10 is shown including Digital Multiphase Pulse Width Modulator (PWM) 20, although frequently PWM 20 is depicted as a distinct power stage. The output of PWM 20 is a series of pulses on each of the output lines, the phase 1 output being provided to driver circuit 30 and the phase 2 output being provided to driver circuit 30'. In a multi-phase system having more than 2 phases, additional phases are connected in a similar manner. Low side FETs 50 and 52, inductors 60 and 62, and capacitor 70 are typically discrete devices. In each phase, (say phase 1 for example), a pulse output stage comprises a high side FET (40), a low side FET (50) and an inductor (60). Similarly, the pulse output stage for phase 2 comprises a high side FET 42, a low side FET 52 and an inductor 62. The pulse output stage charges up capacitor 70 and supplies power to the load. Load 80 is typically a microelectronic component, such as a microprocessor, requiring very accurate power that is regulated and maintained during rapidly changing power requirements.

Digital controller 10 receives a VID input at voltage control 12. VID is a digital number provided by the microprocessor manufacturer describing specific power requirements, in particular the set point, i.e. initial load line voltage at minimum current. Digital controller 10 can also have a reference voltage 14 that is applied to analog-digital converter 16 that also receives, as a second input, the voltage at load 80. The reference voltage from block 14 is used to calibrate the output of analog to digital converter ADC 16 to that reference voltage.

The output of ADC 16 is a digital voltage value that is compared to the output of voltage control circuit 12 (the target voltage) in summer 17 and provided as a digital error voltage to digital compensator 18. Digital compensators such as digital compensator 18 that provide inputs to multi-phase pulse width modulators, such as PWM 20 are well known and described for example in the above cross-referenced patent application, SYSTEM, DEVICE AND METHOD FOR PROVIDING VOLTAGE REGULATION TO A MICROELECTRONIC DEVICE, Ser. No. 10/103,980, filed Mar. 22, 2002, inventors: Duffy et al. of which an inventor in this application is a coinventor. Digital compensator 18 then provides an input to PWM 20 in order to modify the width of the pulses provided to the drivers 30 and 30', etc. of each of the two phases in the illustrated example, and other phases, when utilized. Phase 1 is driven by driver circuits 32 and 34. Circuit 32 drives the gate of FET 40 with a signal that is complementary to the output of circuit 34 that drives the gate of FET 50. FET 40 and 50 have their drain-source paths connected in series, at a common point A, between a first potential source (+V) and a second potential source (ground). Since both FET 40 and 50 are shown as N-channel devices, only one of the two transistors is on at any one time. Of course, if transistor 40 were to be replaced with a P-type transistor, then the same phase signal could be used to drive the gate of both transistor 40 and 50. In either case, there is never a direct current path between +V and ground.

The phase 2 output of PWM 20 is provided to circuits 36 and 38 during phase 2 time in the same way that circuits 32 and 34 receive the pulse width modulate signals during phase 1 time. Circuit 36 then drives the gate of FET 42 and circuit 38 drives the gate of FET 52. Note that although two phases are shown, any number of phases can be used. Larger number of phases provides smoother and more accurate power to the load.

In operation, during phase 1, while the pulse width modulated waveform turns high side FET 40 on, current flows through FET 40 into node A and through inductor 60 to charge capacitor 70 and provide power to load 80. On the other hand, when low side FET 50 is turned on, current flows through FET 50. High side FET 42 and low side FET 52, connected in common at node B operate in a similar manner during phase 2. The voltage from the load 80 is fed back to ADC 16 so that the voltage to the load can be adjusted to changing load conditions. It is desirable to also measure the voltage at node A and node B (and other corresponding nodes in systems with more phases) as an indication of the current being supplied to the load. The cross-referenced patent applications show how the measurements taken at nodes A and B are then used to better regulate the power provided to load 80. Although such a system operates satisfactorily, it has been found that for more rapid response to high speed variations in the power requirements of load 80, a second voltage adjustment technique is desired. In particular, when the voltage excursion from the load line exceeds a predetermined specified amount, then a secondary power adjustment is provided by active transient response (ATR) circuitry.

As shown in FIG. 1, voltage control is provided by Adaptive Voltage Positioning block AVP12. AVP12 also gets an RLOADLINE input, which is a number provided by microprocessor manufacturers indicating the desired slope of the load line. AVP 12 receives an additional input from current ADC13. Current from all the phases at the nodes (node A and node B in the illustrated two phase example) is sensed through resistor R15 and resistor R15', clocked through multiplex circuit 11 at the active phase time and converted to a digital value in ADC 13. This permits AVP12 to provide an adjustment to the target voltage number provided to comparator 17 and active transient response circuit ATR circuit 100. Thus, the target voltage is determined by AVP circuit 12 which adjusts the target voltage in accordance with the specified load line. In addition, AVP12 receives inputs from ATR circuit 100 for providing early and predictive correction of the target voltage, as will be described in greater detail hereinbelow.

ATR circuit 100 is coupled between the output stage, at load 80 and multi phase PWM20 and is configured to detect the voltage level at the load. In case the transient voltage at the load deviates from the target voltage by one or more of the preset thresholds, ATR100 provides a signal to PWM20 that is a function of the amplitude of the deviation of the detected voltage from the target voltage. The ATR100 output will be one of: ATRL, ATRH1, ATRH2, or ATRH3.

ATR100 is also coupled between the output stage, at load 80, and AVP12 to provide one of the signals indicative of an ATR event, i.e. one of ATR signals (ATRL, ATRH1, ATRH2, or ATRH3) to AVP12. This enables AVP12 to provide an early, predictive change to summer 17. This predictive change can occur prior to the time that the sensed current change is received from ADC13 because the sensed load current change is delayed passing through inductors 60, 62, and other similar inductors in additional phases.

As long as the voltage at the load is maintained within predetermined limits, ATR circuit 100 is not activated and no output signals are provided by ATR circuit 100. However, when the changes in power demands by the load result in a voltage excursion at the load that exceeds the predetermined limits, ATR circuit 100 provides ATRL, ATRH1, ATRH2, or ATRH3 signals to PWM generator 20 to correct the voltage deviation rapidly and with minimal noise generation. As shown in FIG. 1, these same signals are provided to AVP12.

Figures 2, 3:
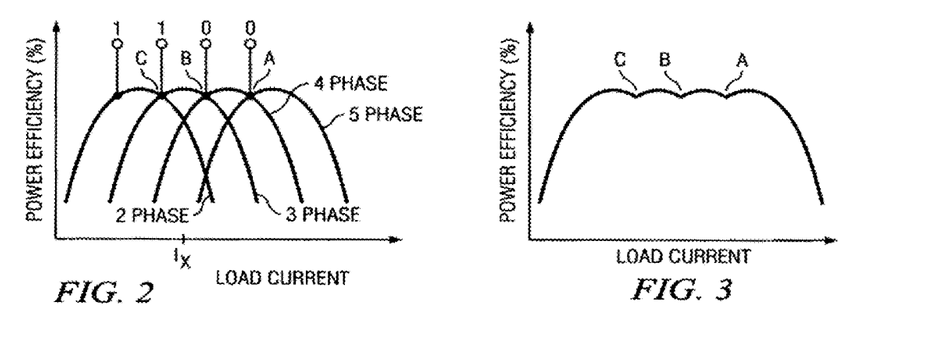
FIG. 2 is a waveform diagram illustrating power efficiency as a function of load current in a multiphase power regulator.
FIG. 3 is a composite waveform diagram illustrating power efficiency as a function of load current in a multiphase power regulator.

Refer now to FIG. 2 illustrating Power Efficiency (as a percentage) as a function of load current. The four identified waveforms are identified as 2 phase, 3 phase, 4 phase and 5 phase. It is immediately apparent that with increased load current, the utilization of a larger number of phases optimizes efficiency. Thus, with a load current greater than at intersection point A, 5 phases (or more as the load current continues to increase) provide the greatest efficiency. At very low load current levels (e.g. to the left of intersection point C), a 2 phase system produces the highest efficiency. If load current were to continue to decrease, a one phase system would produce the highest efficiency.

By way of further illustration, assume a load current at $I_x$. This is a current level between intersection points B and C. In this current range, a 3 phase system provides the highest efficiency. In accordance with the invention, load current is sensed and if the average current level is between intersection points B and C, the number of active phases is adjusted to 3 phase operation. Depending on the number of active phases operating prior to this current level, the number of phases is either increased or decreased to achieve 3 phase operation. The average current level at intersection points such as A, B, and C is conveniently measured and converted to a thermometer code as indicated in the diagram. Accordingly, the illustrated 1, 1, 0, 0 word represents an average load current level between intersection points B and C. For the sake of completeness, FIG. 3 showing an actual composite curve with intersection points A, B, and C is provided. The actual method of activating the optimum number of phases by dropping and adding phases is achieved by various operating modes. These operating modes are implemented in a digital controller that controls the number of phases activated upon the measurement of load current and load voltage. The techniques described will include several methods for slow phase drop, a method for slow phase add, and a method for fast phase add.

Figure 4:
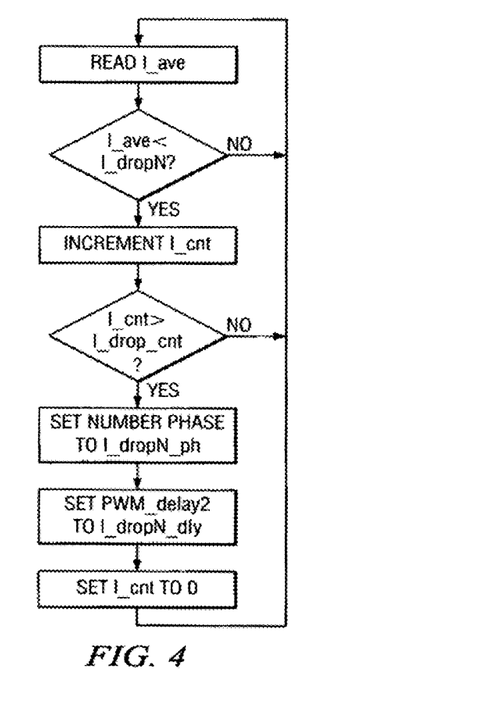
FIG. 4 is a flow chart illustrating one method of the invention in which active phases are dropped slowly.

Refer now to FIG. 4, illustrating a method of slow dropping phases. The controller measures the average load current and compares this current to each of several programmable (adjustable) thresholds. The number of thresholds is typically one lower than the number of phases (i.e. a 6 phase system has 5 thresholds). The average current can be measured through various means such as FET RDSon, Inductor DCR, or integrated current mirror, as disclosed in the cross-referenced patent applications and specifically incorporated herein by reference. For example, see DIGITAL CALIBRATION WITH LOSSLESS SENSING IN A MULTIPHASE SWITCHED POWER CONVERTER, Ser. No. 10/884,840, filed Jul. 2, 2004, inventors: Southwell et al The average current (I_ave) is read and compared with the threshold current for dropping a phase (I_dropN). The controller makes a decision to adjust the number of phases to a lower number based upon the number of consecutive current samples that are less than the programmable threshold. This number (count) is programmable and can be adjusted for optimum system phase drop timing. As shown in FIG. 4, if the current count (I_cnt) is larger than the programmed threshold (I_drop_cnt), then a signal to drop phases is provided. The controller then disables the required number of phases. The controller can either adjust the timing of the phases to provide optimum phase spacing for the lowest ripple or simply disable the phases and keep the timing the same. The controller then adjusts the average current measurement by removing the disabled channel current reporting (which is now zero) from the average current measurement. The controller then adjusts the non-overlap time to a predefined value to optimize the FET switch timing for the number of phases enabled. The non-overlap time is the time delay between low side FET turn-off and HSFET turn-on. As previously noted in reference to FIG. 1, the low side FETs are 50 and 52 while the high side FETs (HSFET) are 40 and 42. In order to avoid a DC current path from the power source to ground across both a high side and low side FET, the high side FET is turned off and after a pre-determined delay the low side FET is turned on. For optimum efficiency, this predetermined delay is varied depending on the number of active phases.

Figure 5:
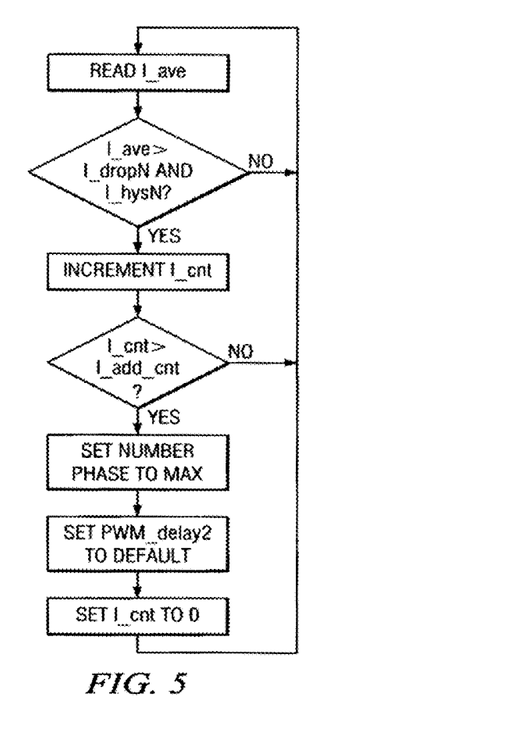
FIG. 5 is a flow chart illustrating a method of the invention in which active phases are added slowly.

Refer now to FIG. 5 illustrating a method of slow adding phases. As in the case of slow phase dropping, the controller measures the average load current and compares this current to each of several programmable (adjustable) thresholds. The number of thresholds is typically one fewer than the number of phases (i.e. a 6 phase system has 5 thresholds). As in the case of slow phase dropping, the average current can be measured through various means such as FET RDSon, Inductor DCR, or integrated current mirror, as disclosed in the cross-referenced patent applications and specifically incorporated herein by reference. The controller makes a decision to adjust the number of phases to a higher number based upon the number of consecutive current samples that are greater than the programmable threshold plus a programmable hysteresis value. The hysteresis value is required to insure that the controller does not continually try to adjust the phase count if the average load current is right near a threshold. This number (count) is programmable and can be adjusted for optimum system phase add timing.

The controller then enables the required number of phases. The controller can either adjust the timing of the phases to provide optimum phase spacing for lowest ripple or simply disable the phases and keep the timing the same. The controller then adjusts the average current measurement by adding the disabled channel current reporting to the average current measurement. The controller then adjusts the non-overlap time to a predefined value to optimize the FET switch timing for the number of phases enabled.

Figure 6:
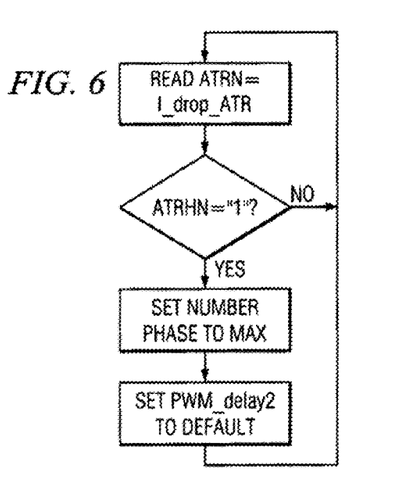
FIG. 6 is a flow chart illustrating a method of the invention in which active phases are added quickly.

Refer now to FIG. 6 for a flow chart diagram describing the fast adding of phases. The controller continually monitors the state of a fast voltage comparator that is comparing the output voltage to a programmable threshold (ATRH). In fact, multiple programmable thresholds (e.g. ATRH1, ATRH2, and ATRH3) can be programmed and the desired threshold chosen as the trigger point at which the controller immediately enables all phases. The controller immediately adjusts the average current measurement to include all available phases. In addition, the controller immediately resets the non-overlap timing to the value associated with the maximum available phases. As already noted, in controllers with multiple ATRH comparators, the comparator used to signal engagement of the fast phase add is selectable.

Figure 7:
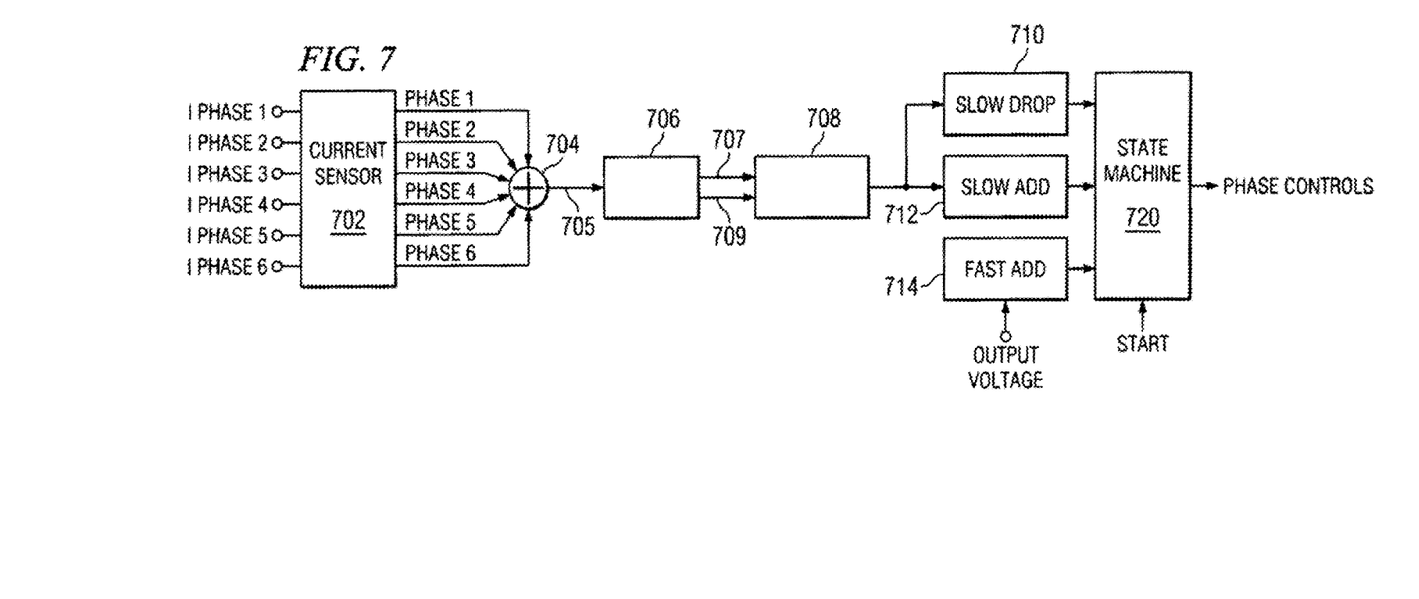
FIG. 7 is a schematic diagram illustrating an exemplary embodiment of the invention.

Refer now to FIG. 7, which illustrates in block diagram format an exemplary system for generating phase control signals based on the current measured in a six phase power regulator. Each of the currents (I phase 1 through I phase 6) is detected in current sense circuit 702. Current sensing at each phase is accomplished in any one of several known ways, as previously described. Current sense circuit 702 also converts each of the phase currents into a digital representation, e.g. a digital word. These digital values are totaled in adder circuit 704 and the resultant sum is provided to averaging circuit 706 on line 705. Circuit 706 provides the time averaged total current to threshold detecting circuit 708 on line 707. Circuit 706 also provides an update signal on line 109 after a fixed programmable time window to reduce the effect of system noise. Thus, the updated signal on line 709 indicates that the new average output is ready and thereby gates the new average total system current into current threshold detection circuit 708.

In the FIG. 7 configuration, the circuit 708 provides an output signal that indicates the quadrant in which the voltage regulator should be operating for maximum efficiency. This signal is provided to slow drop circuit 710 and slow add circuit 712. The voltage regulator output voltage is provided as an input signal to fast add circuit 714. The outputs of circuits 710, 712, and 714 are provided to state machine 720. State machine 720 knows the number of phases that are operating and provides the phase control signals. Depending on the inputs from circuits 710, 712, and 714, state machine 720 provides a phase control signal that will either 1. maintain operation at the current number of phases, 2. Fast add phases to immediately activate all phases, 3. Slowly add one phase at a time until the desired number of phases is reached or 4. Slow drop phases either one phase at a time or drop directly to any lower phase state without stopping at the intermediate phase states. The phase control signal can be a 6 bit digital output that enables phases to turn on or off.

Figure 8:
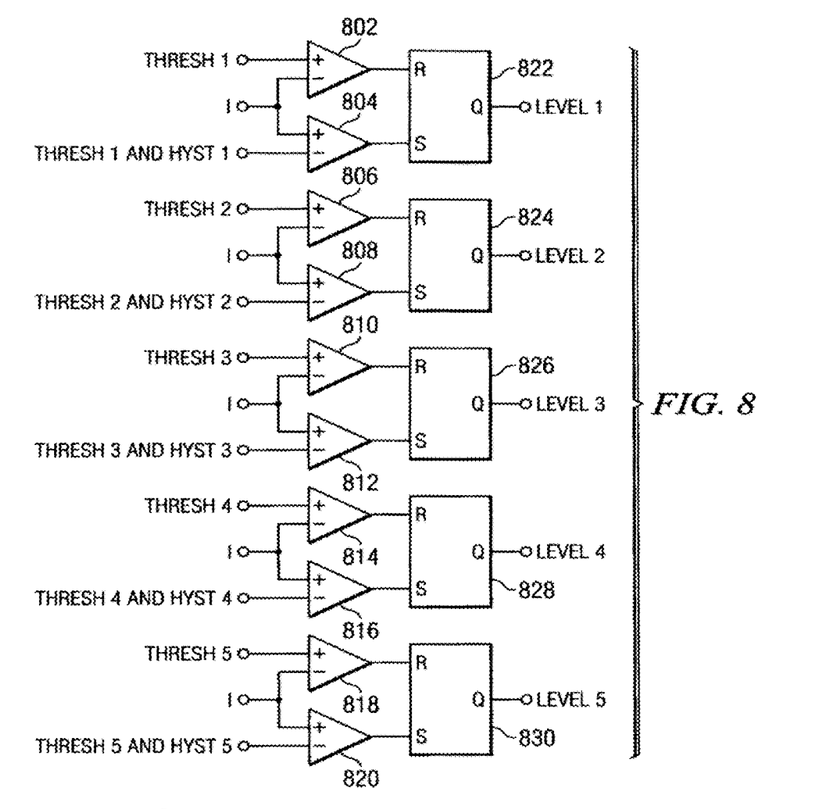
FIG. 8 is a schematic diagram illustrating current threshold detection in accordance with the invention.

Refer now to FIG. 8, which is a schematic diagram of a current threshold detection circuit, as for example, circuit 708 in FIG. 7. The illustrated circuit is exemplary of an N phase system in which N=6. The number of levels required to adjust an N phase system is N−1, in this case 5 levels. Comparator circuits and latch circuits can be conveniently used as circuits for determining how many of the level outputs (level 1 to level 5) should be on for optimum operating efficiency. Thus, comparator circuit 802 determines whether of not the average input current (I) is greater or smaller than the predetermined threshold 1. Comparator circuit 804 determines whether the average input current (I) is greater or smaller than the predetermined threshold 1 plus a hysteresis level. The level applied to the negative input of comparator 804 is thus the sum of threshold 1+hysteresis 1, thereby preventing the repetitive changing of the outputs of comparators 802 and 804 when the input current I is near threshold level 1.

The other comparator circuits work similarly as comparator circuits 802 and 804, for their respective levels. Thus for threshold level 2, comparator circuit 806 determines whether of not the average input current (I) is greater or smaller than the predetermined threshold 2. Comparator circuit 808 determines whether the average input current (I) is greater or smaller than the predetermined threshold 2 plus a hysteresis level. Note that threshold 2 could correspond to point C on the waveform in FIG. 2. Similarly, comparator circuit 810 determines whether of not the average input current (I) is greater or smaller than the predetermined threshold 3 (e.g. point B on the waveform in FIG. 2). Comparator circuit 812 determines whether the average input current (I) is greater or smaller than the predetermined threshold 3 plus a hysteresis level. Similarly, comparator circuit 814 determines whether of not the average input current (I) is greater or smaller than the predetermined threshold 4 (e.g. point A on the waveform in FIG. 2). Comparator circuit 816 determines whether the average input current (I) is greater or smaller than the predetermined threshold 4 plus a hysteresis level. Similarly, comparator circuit 818 determines whether of not the average input current (I) is greater or smaller than the predetermined threshold 5. Comparator circuit 820 determines whether the average input current (I) is greater or smaller than the predetermined threshold 5 plus a hysteresis level.

The outputs of comparator circuits 802 and 804 are provided as inputs to latch circuit 822. The output of circuit 802 resets latch 822 (when the input current I is less than level THRESH 1). The output of circuit 804 sets latch 822 (when the input current is greater than THRESH+HYST 1), causing the output of latch 822 to provide the appropriate level 1 output. Similarly, the outputs of comparator circuits 806 and 808 are provided as inputs to latch circuit 824, the outputs of comparator circuits 810 and 812 are provided as inputs to latch circuit 826, the outputs of comparator circuits 814 and 816 are provided as inputs to latch circuit 828, and the outputs of comparator circuits 818 and 820 are provided as inputs to latch circuit 830. Each of the latch circuits provides an output (e.g. levels 2-5) to circuits 710 and 712 (FIG. 7) determining whether a phase should be added or dropped.

Figure 9:
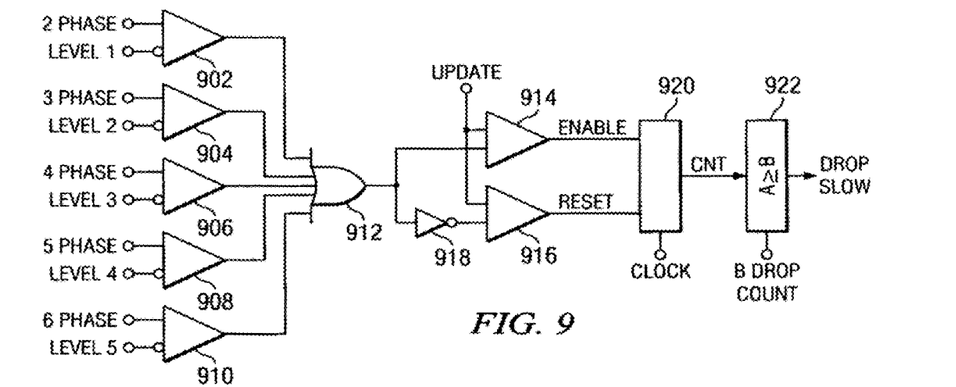
FIG. 9 is a schematic diagram illustrating exemplary circuitry for the slow dropping of phases one at a time.

Refer now to FIG. 9 for an exemplary slow drop circuit 710 (FIG. 7). The inverted level 1 output from circuit 822 (FIG. 8) and the phase 2 signal are received at AND circuit 902. Similarly, the inverted level 2 output from circuit 824 (FIG. 8) and the phase 3 signal are received at AND circuit 904. Similarly, inverted level 3 output from circuit 826 (FIG. 8) and the phase 4 signal are received at AND circuit 906. Similarly, inverted level 4 output from circuit 828 (FIG. 8) and the phase 5 signal are received at AND circuit 908. Lastly, inverted level 5 output from circuit 830 (FIG. 8) and the phase 6 signal are received at AND circuit 910. The outputs of all the AND circuits are provided as inputs to OR circuit 912, which provides an output if any of its inputs are at a high logic level. The output of OR circuit 912 is provided to AND circuit 914 and the inverted output is provided to AND circuit 916, as inverted in circuit 918. AND circuits 914 and 916 also receive a second input (UPDATE). AND circuit 914 provides an ENABLE SIGNAL and circuit 916 provides a RESET SIGNAL to n bit digital counter 920. The maximum count in counter 920 is $2^n$. Therefore, if n=8 then the maximum count in counter 920 is 256. Counter also receives a clock input that can be a clock signal at e.g. 40 mhz.

In operation, the n bit digital counter 920 counts the number of average total current readings in a row that are below the phase drop threshold (cnt) and provides this number to the comparator circuit 922. Comparator 922 also receives (on terminal B) the programmable setting that determines the count at which a phase should be dropped. Thus, when the signal (cnt) is greater than the programmable drop count signal provided on terminal B, comparator 922 provides a "DROP SLOW" signal to state machine 720 (FIG. 7). The FIG. 9 circuit can only cause the dropping of one phase at a time to the next lower setting (e.g. 6 to 5, 5 to 4, 4 to 3, 3 to 2 or 2 to 1). Although this dropping of phases one at a time is slow, it has the advantage of being less prone to glitches.

Figure 10:
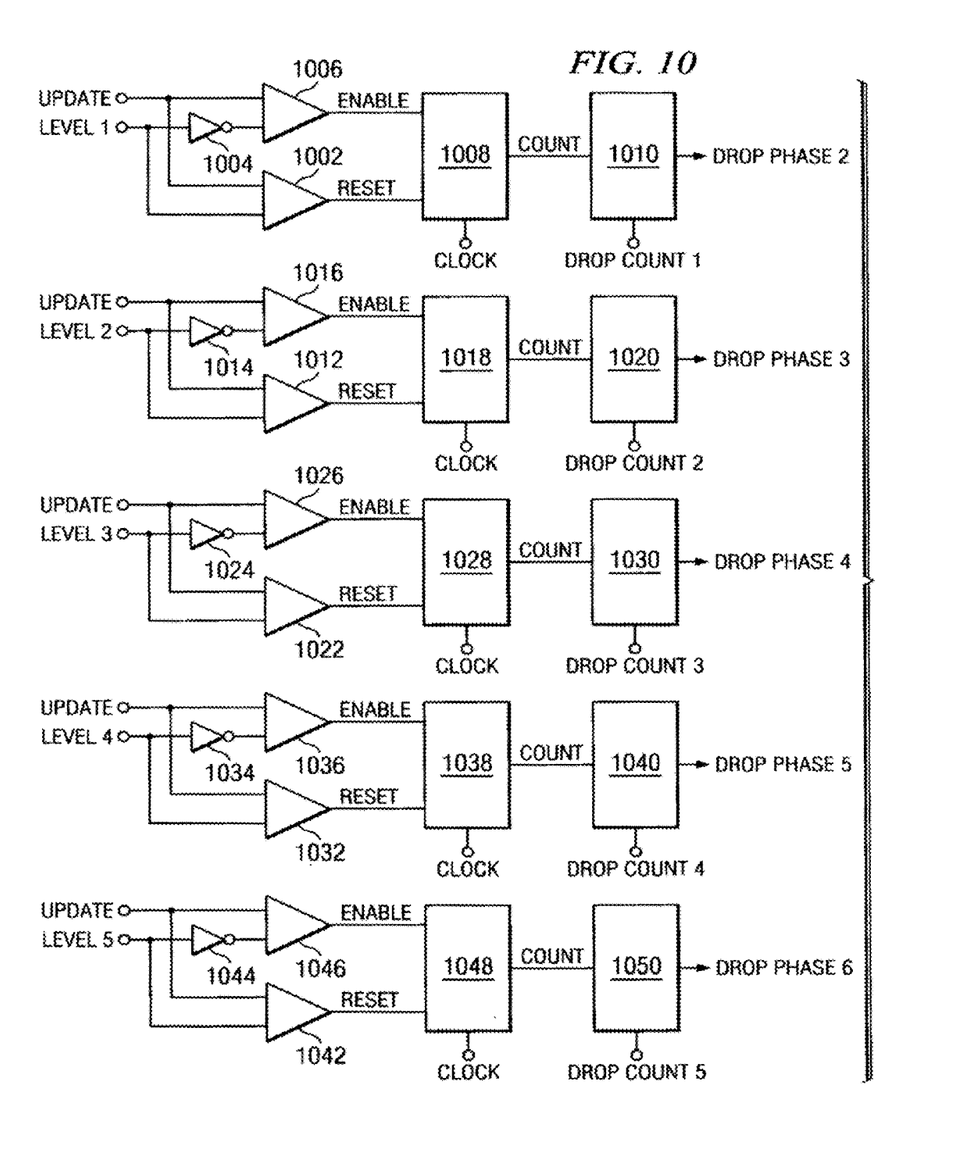
FIG. 10 is a schematic diagram illustrating exemplary circuitry for the slow dropping of phases directly.

Refer now to FIG. 10, which is a schematic diagram of another embodiment of a slow drop circuit, as for example circuit 710 (FIG. 7). In the FIG. 10 embodiment, a particular phase can be dropped directly. The level 1 output from circuit 822 (FIG. 8) and an update signal are received at AND circuit 1002. The level 1 input is inverted in inverter 1004 and the inverted level 1 signal as well as the update signal are inputted to AND circuit 1006. Thus, in the presence of an update signal and the inverted level 1 signal, counter 1008 receives an enable signal and begins counting at a rate determined by the frequency of the clock input. Counter 1008 is an n bit counter as described hereinabove. Upon the occurrence of a level 1 signal and the update signal, AND circuit 1002 provides a reset signal to counter 1008. The count that is achieved is provided to compare circuit 1010, which also receives the programmable number for dropping this phase (drop count 1). If the count received into circuit 1010 is greater than the drop count 1 number, a drop phase signal is produced by circuit 1010. For example, the output command is to drop phase 2 (2 phases enabled).

The circuitry for the other phases has the same structure and mode of operation. For level 2, the corresponding circuits comprise AND circuits 1012 and 1016, invert circuit 1014, counter 1018 and compare circuit 1020, all connected and operating as described for level 1. For level 3, the corresponding circuits comprise AND circuits 1022 and 1026, invert circuit 1024, counter 1028 and compare circuit 1030, all connected and operating as described for level 1. For level 4, the corresponding circuits comprise AND circuits 1032 and 1036, invert circuit 1034, counter 1038 and compare circuit 1040, all connected and operating as described for level 1. Finally, for level 5, the corresponding circuits comprise AND circuits 1042 and 1046, invert circuit 1044, counter 1048 and compare circuit 1050, all connected and operating as described for level 1.

Figure 11:
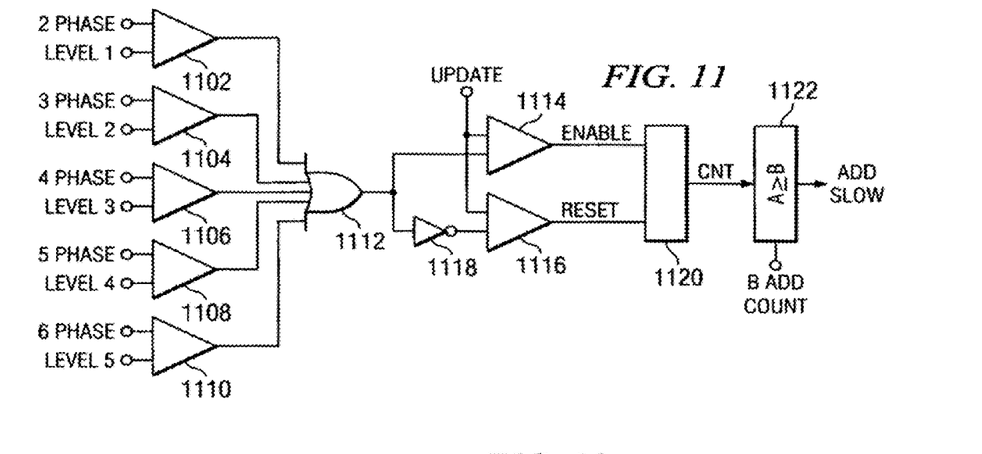
FIG. 11 is a schematic diagram illustrating exemplary circuitry for the slow adding of phases.

Refer now to FIG. 11, which is a schematic diagram of an exemplary slow add circuit 712, as shown for example in FIG. 7. The level 1 output from circuit 822 (FIG. 8) and the phase 2 signal are received at AND circuit 1102. Similarly, the level 2 output from circuit 824 (FIG. 8) and the phase 3 signal are received at AND circuit 1104. Similarly, level 3 output from circuit 826 (FIG. 8) and the phase 4 signal are received at AND circuit 1106. Similarly, level 4 output from circuit 828 (FIG. 8) and the phase 5 signal are received at AND circuit 1108. Lastly, the level 5 output from circuit 830 (FIG. 8) and the phase 6 signal are received at AND circuit 1110. The outputs of all the AND circuits are provided as inputs to OR circuit 1112, which provides an output if any of its inputs are at a high logic level. The output of OR circuit 1112 is provided to AND circuit 1114 and the inverted output is provided to AND circuit 1116, as inverted in circuit 1118. AND circuits 1114 and 1116 also receive a second input (UPDATE). AND circuit 1114 provides an ENABLE SIGNAL and circuit 1116 provides a RESET SIGNAL to n bit digital counter 1120. The maximum count in counter 1120 is $2^n$. Therefore, if n=8 then the maximum count in counter 1120 is 256. Counter 1120 also receives a clock input that can be a clock signal at e.g. 40 mhz.

In operation, the n bit digital counter 1120 counts the number of average total current readings in row that are above the phase add threshold (cnt) and provides this number to the comparator circuit 1122. Comparator 1122 also receives (on terminal B) the programmable setting that determines the count at which a phase should be added. Thus, when the signal (cnt) is greater than the programmable add count signal provided on terminal B, comparator 1122 provides an "ADD SLOW" signal to state machine 720 (FIG. 7). The FIG. 11 circuit can be used to add one phase at a time or, as in the embodiment shown in FIGS. 14A, 14B and 15, it can be combined with the fast add signal to return to the all phases enabled case.

Figure 12:
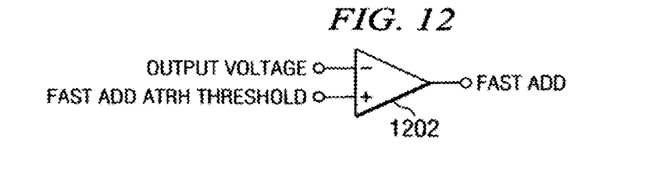
FIG. 12 is a schematic diagram illustrating exemplary circuitry for the fast adding of phases.
Figure 13:
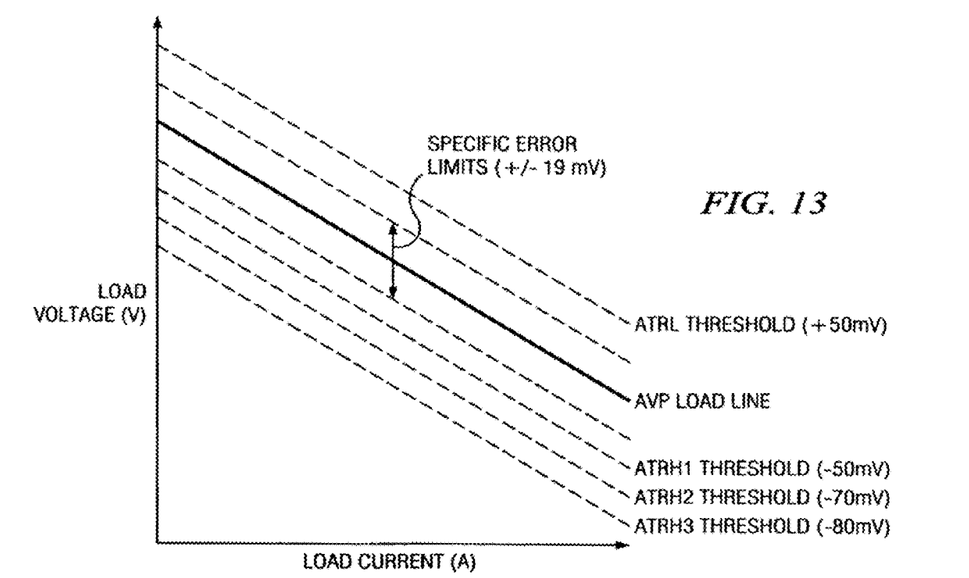
FIG. 13 is a waveform diagram illustrating exemplary thresholds to detect the amplitude of an excursion from the desired AVP load line.

Thus, as illustrated in FIG. 12 (which is an exemplary embodiment of circuit 714 in FIG. 7), when the output voltage of the voltage regulator falls below the fast add ATRH threshold a fast add signal is immediately sent to state machine 720 (FIG. 7). FIG. 13 is a diagram illustrating load voltage v. load current and the desired AVP load line. The detection of when the excursion reaches ATRH1, ATRH2 or ATRH3 is described in detail in the aforementioned patent applications, in particular MULTI-THRESHOLD MULTI-GAIN ACTIVE TRANSIENT RESPONSE CIRCUIT AND METHOD FOR DIGITAL MULTIPHASE PULSE WIDTH MODULATED REGULATORS, Ser. No. 10/938,031 filed Sep. 10, 2004, inventors Tang et al. The fast add ATRH threshold can be set to be triggered at any desired ATRH threshold level. Upon the occurrence of a Fast Add output from comparator 1202, state machine 720 immediately sends a signal to turn all phases on.

Figure 14A:
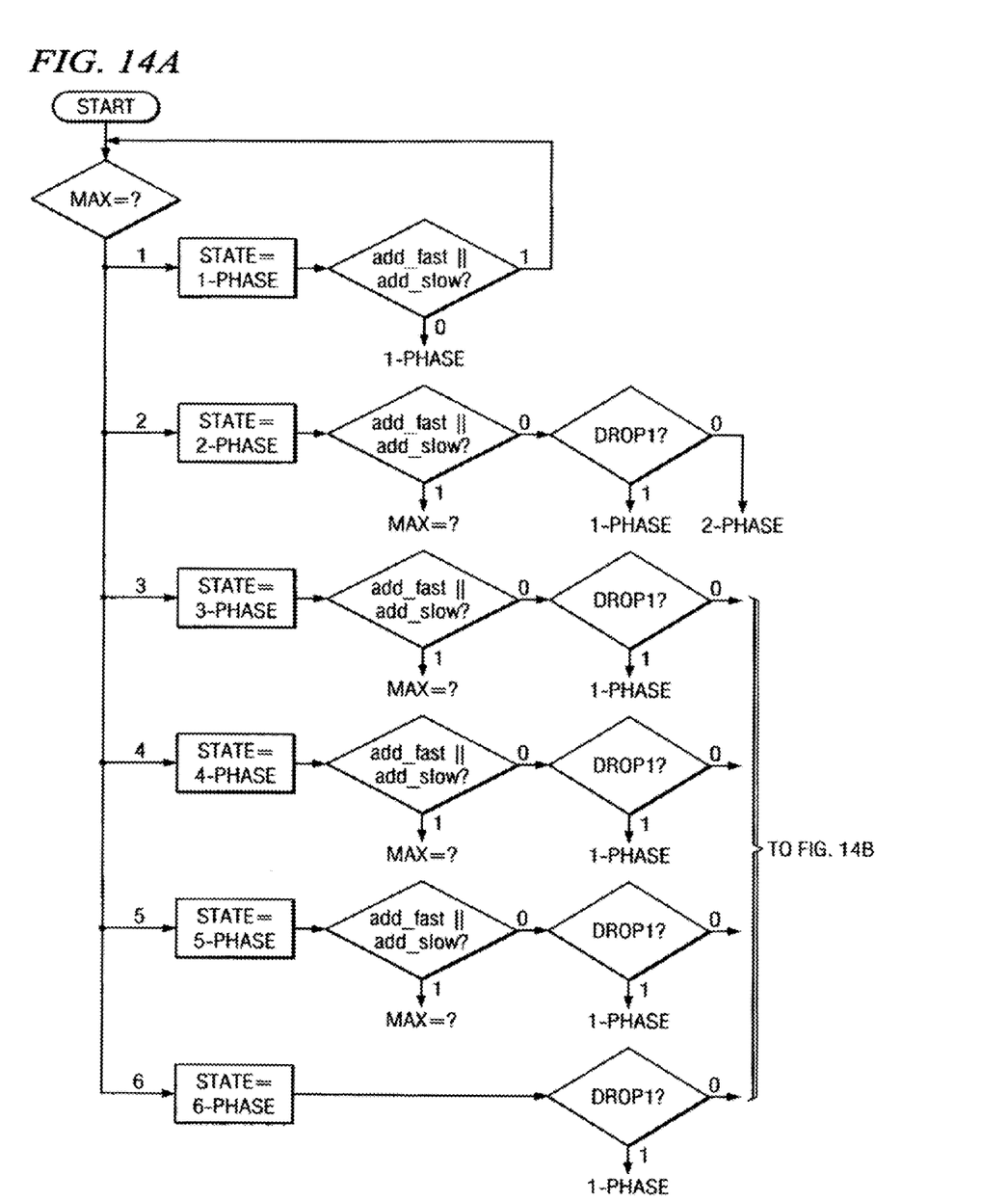
FIGS. 14A and 14B are a flow chart illustrating the operation of a state machine with a direct slow drop of phases in a six phase system.
Figure 14B:
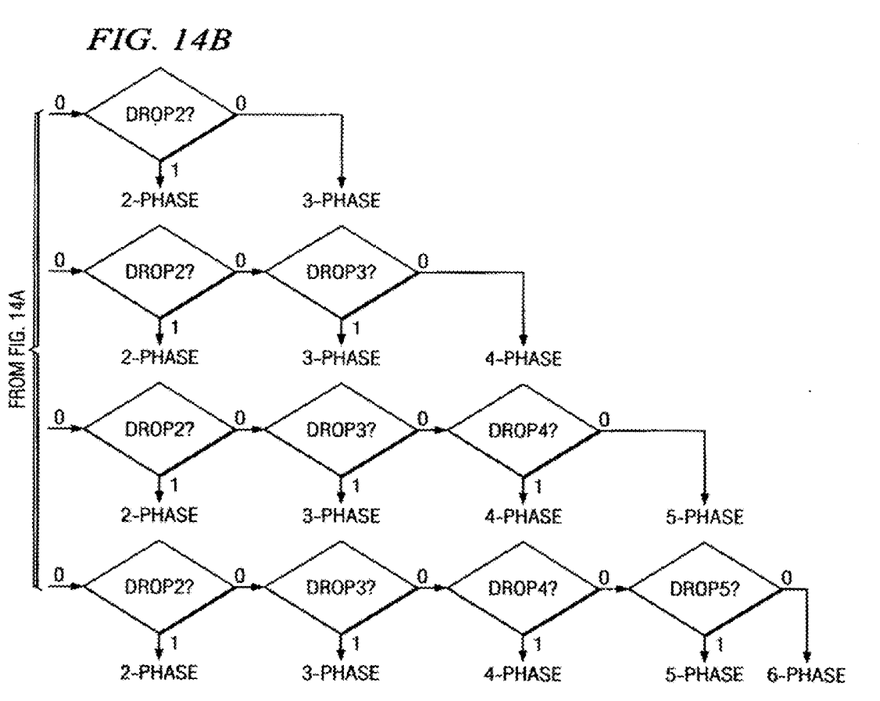

Refer now to FIGS. 14A and 14B illustrating one embodiment of a 6 phase state machine 720. Assume by way of example, that 4 phases are active and therefore the state=4 phases is active and points to the decision block to add fast or add slow. If the state machine receives a fast add input, all phases are immediately turned on. If the state machine receives a slow add input, a phase is added and the state of the state machine will be: state=5 phase. If neither a fast add or slow add signal is received, a "0" output activates the next decision block to directly drop phase 1. If phase 1 is not to be dropped, a "0" signal activates the next decision drop—to drop phase 2. If none of the decision blocks are activated, the output of the last decision block is fed back to maintain the state=4 phases status. This embodiment (FIGS. 14A and 14B) illustrates the operation of the exemplary FIG. 10 direct slow drop circuit.

Figure 15:
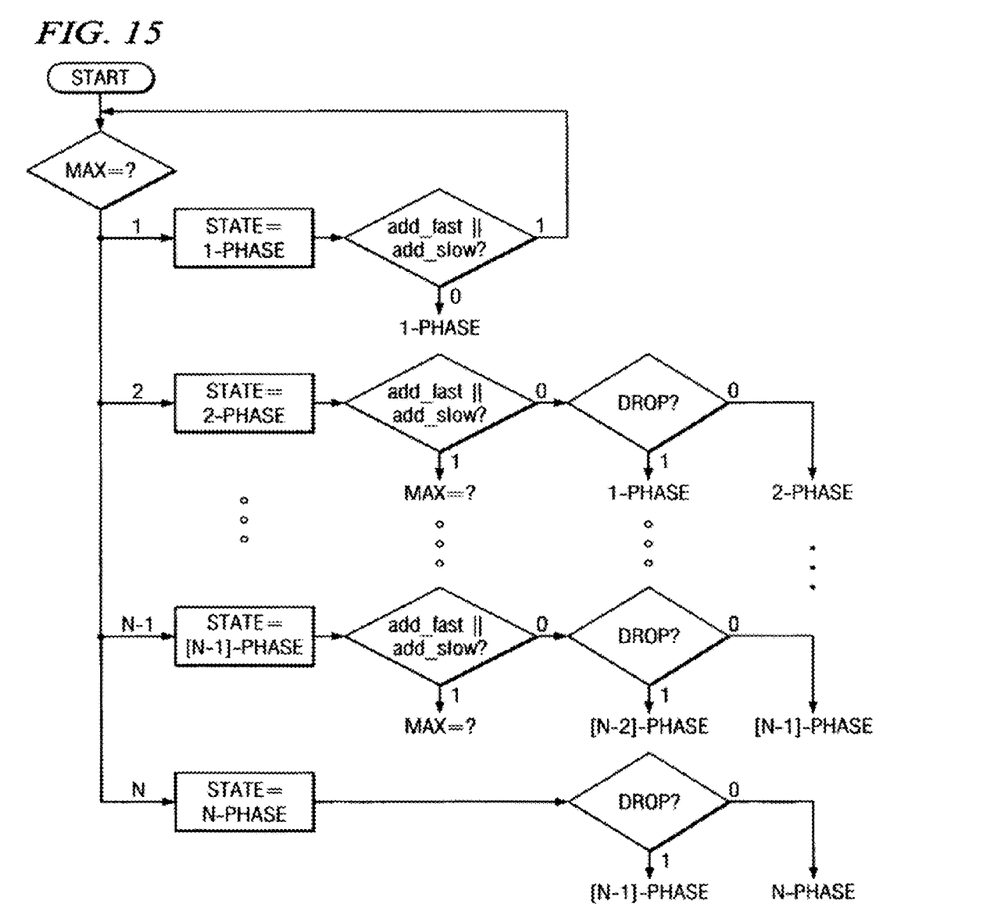
FIG. 15 is a flow chart illustrating the operation of a state machine with a one at a time slow drop of phases in an N-phase system.

For an example of the operation of the one at a time slow drop of phases as described in FIG. 9, see the n phase example shown in FIG. 15. Note that the FIG. 15 illustration has the same fast add and slow add implementation as FIGS. 614A and 14B. However, after the add fast/add slow decision block there is only one phase drop decision block. In case the output of this block is "0", the number of active phases remains the same. However, if a phase needs to be dropped then one phase is dropped and the operation drops to the next lowest phase. For example, if the state=N phase, then the operation drops to state=N−1 phase.

The present invention has been described above with reference to various exemplary embodiments. However, those skilled in the art will recognize that changes and modifications may be made to the exemplary embodiments without departing from the spirit and scope of the present invention. For example, the various components may be implemented in alternate ways, such as, for example, by providing other configurations of SPC's. By way of another example, the number of phases utilized is a matter of design choice. By way of a still further, the specific Pulse Width Modulator used to generate the PWM pulses is also a matter of design choice. Such changes or modifications are intended to be included within the spirit and scope of the present invention.

What is claimed is:

1. A multiphase voltage regulator, comprising:
a plurality of phases, wherein each phase is configured to be enabled and disabled; and
a controller configured to adjust the number of enabled phases according to an optimal number of phases for substantially maximum efficiency based on an output condition, including being configured to slow drop an enabled phase, wherein the controller is further configured to:
receive a phase current from each enabled phase and output a total current;
produce a time averaged total current based on the total current;
compare the time averaged total current to a plurality of thresholds to determine an optimal number of phases; and
compare the number of enabled phases with the optimal number of phases and output a phase control signal.

2. A multiphase voltage regulator as in claim 1, wherein the controller is further configured to adjust a non-overlap time on each enabled phase.

3. A multiphase voltage regulator as in claim 1, wherein the threshold detecting circuit comprises a plurality of comparator circuits.

4. A multiphase voltage regulator as in claim 1, wherein the controller further comprises:
a slow drop circuit;
a slow add circuit; and
a fast add circuit;
wherein the slow drop circuit, the slow add circuit, and the fast add circuit are coupled to the threshold detecting circuit and provide outputs configured to determine a speed at which to adjust the number of enabled phases.

5. A multiphase voltage regulator as in claim 4, wherein the slow drop circuit comprises:
a counter configured to generate a count of a number of consecutive clock cycles the number of enabled phases exceeds the optimal number of phases for substantially maximum efficiency; and
a comparator circuit configured to receive the output of the counter and generate a drop slow signal that is outputted to a state machine.

6. A multiphase voltage regulator as in claim 4, wherein the slow drop circuit comprises:
a plurality of counters configured to generate a count of a number of clock cycles a phase level signal indicates a phase should be dropped; and
a plurality of comparators configured to compare the counts generated to a threshold and output a phase drop signal for each phase that exceeds the threshold.

7. A multiphase voltage regulator as in claim 4, wherein the slow add circuit comprises:
a counter configured to generate a count of a number of consecutive times the number of enabled phases is below the optimal number of phases for substantially maximum efficiency; and
a comparator circuit configured to receive the output of the counter and generate an add slow signal that is outputted to a state machine.

8. A multiphase voltage regulator as in claim 4, wherein the fast add circuit comprises a comparator configured to generate a signal to turn all phases on when a threshold is exceeded.

9. A multiphase voltage regulator as in claim 8, wherein the fast add circuit further comprises an ATR input, wherein the fast add circuit is further configured to generate the signal to turn all phases on during an ATR event.

10. A method of adjusting a number of enabled phases in a multiphase voltage regulator, comprising:
measuring an output current;
adjusting the number of enabled phases to an optimal number of phases for substantially maximum efficiency based on an output condition, including slow dropping an enabled phase by:
receiving a phase current from each enabled phase and outputting a total current;
producing a time averaged total current based on the total current;
comparing the time averaged total current to a plurality of thresholds to determine an optimal number of phases; and
comparing the number of enabled phases with the optimal number of phases and outputting a phase control signal.

11. A method of adjusting the number of enabled phases in a multiphase voltage regulator as in claim 10, wherein slow dropping an enabled phase comprises dropping an enabled phases one at a time until the optimal number of phases is reached.

12. A method of adjusting the number of enabled phases in a multiphase voltage regulator as in claim 10, comprising directly dropping enabled phases.

13. A method of adjusting the number of enabled phases in a multiphase voltage regulator as in claim 10, wherein adjusting the number of enabled phases to the optimal number of phases further comprises activating additional phases slowly.

14. A method of adjusting the number of enabled phases in a multiphase voltage regulator as in claim 10, wherein adjusting the number of enabled phases to the optimal number of phases further comprises adjusting a non-overlap time on each enabled phase.

15. A method of adjusting the number of enabled phases in a multiphase voltage regulator as in claim 10, wherein adjusting the number of enabled phases to the optimal number of phases further comprises activating additional phases quickly.

16. A method of adjusting the number of enabled phases in a multiphase voltage regulator as in claim 15, wherein activating additional phases quickly comprises activating additional phases quickly when a transient amplitude passes a threshold.

17. A multiphase voltage regulator, comprising:
a plurality of phases configured to be enabled and disabled;
a current sense circuit configured to measure a load current; and
a controller configured to adjust the number of enabled phases to an optimal number of phases for substantially maximum efficiency based on the load current, the controller comprising:
an adder circuit configured to receive a phase current from each enabled phase and output a total current;
an averaging circuit configured to receive the total current and produce a time averaged total current;
a threshold detecting circuit configured to compare the time averaged total current to a plurality of thresholds to determine an optimal number of phases; and
a comparison circuit configured to compare the number of enabled phases with the optimal number of phases and output a phase control signal.

18. A multiphase voltage regulator as in claim 17, wherein the controller further comprises:
a slow drop circuit;
a slow add circuit; and
a fast add circuit;
wherein the slow drop circuit, the slow add circuit, and the fast add circuit are coupled to the threshold detecting circuit and provide outputs configured to determine a speed at which to adjust the number of enabled phases.

19. A multiphase voltage regulator as in claim 18, wherein the slow drop circuit comprises:
a counter configured to generate a count of a number of consecutive clock cycles the number of enabled phases exceeds the optimal number of phases for substantially maximum efficiency; and
a comparator circuit configured to receive the output of the counter and generate a drop slow signal that is outputted to a state machine.

20. A multiphase voltage regulator as in claim 18, wherein the slow drop circuit comprises:
a plurality of counters configured to generate a count of a number of clock cycles a phase level signal indicates a phase should be dropped; and
a plurality of comparators configured to compare the counts generated to a threshold and output a phase drop signal for each phase that exceeds the threshold.

21. A multiphase voltage regulator as in claim 18, wherein the slow add circuit comprises:
a counter configured to generate a count of the number of consecutive clock cycles the number of enabled phases is below the optimal number of phases for substantially maximum efficiency; and
a comparator circuit configured to receive the output of the counter and generate an add slow signal that is outputted to a state machine.

22. A multiphase voltage regulator as in claim 18, wherein the controller is further configured to adjust a non-overlap time on each enabled phase.

23. A multiphase voltage regulator as in claim 18, wherein the fast add circuit comprises a comparator configured to generate a signal to turn all phases on when a threshold is exceeded.

24. A multiphase voltage regulator as in claim 23, wherein the fast add circuit further comprises an ATR input, wherein the fast add circuit is further configured to generate the signal to turn all phases on during an ATR event.

* * * * *